(12) United States Patent
Blount et al.

(10) Patent No.: US 7,191,207 B2
(45) Date of Patent: Mar. 13, 2007

(54) APPARATUS AND METHOD TO DYNAMICALLY ALLOCATE BANDWIDTH IN A DATA STORAGE AND RETRIEVAL SYSTEM

(75) Inventors: Lawrence C. Blount, Tucson, AZ (US); Thomas C. Jarvis, Tucson, AZ (US); Steven R. Lowe, Tucson, AZ (US); David F. Mannenbach, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/459,645

(22) Filed: Jun. 11, 2003

(65) Prior Publication Data

US 2004/0255026 A1   Dec. 16, 2004

(51) Int. Cl.
G09F 15/173 (2006.01)
G06F 9/00 (2006.01)

(52) U.S. Cl. ............. 709/200; 711/112; 370/208; 709/105

(58) Field of Classification Search ........... 709/105, 709/200, 226, 227; 370/208, 280, 466; 711/112
See application file for complete search history.

(56) References Cited

U.S. PATENT DOCUMENTS

| | | | |
|---|---|---|---|
| 5,522,054 A | 5/1996 | Gunlock et al. | 395/439 |
| 5,649,156 A | 7/1997 | Vishlitzky et al. | 395/463 |
| 5,829,043 A | 10/1998 | Gilet et al. | 711/154 |
| 5,949,791 A * | 9/1999 | Byers et al. | 370/466 |
| 6,016,311 A * | 1/2000 | Gilbert et al. | 370/280 |
| 6,092,149 A | 7/2000 | Hicken et al. | 711/113 |
| 6,141,317 A * | 10/2000 | Marchok et al. | 370/208 |
| 6,260,108 B1 | 7/2001 | Barve et al. | 711/112 |
| 6,301,640 B2 | 10/2001 | Barve et al. | 711/113 |
| 6,473,394 B1 * | 10/2002 | Marchok et al. | 370/208 |
| 2001/0013084 A1 | 8/2001 | Barve et al. | 711/113 |
| 2002/0004885 A1 | 1/2002 | Francis et al. | 711/118 |
| 2002/0194251 A1 * | 12/2002 | Richter et al. | 709/105 |
| 2003/0046396 A1 * | 3/2003 | Richter et al. | 709/226 |
| 2004/0255026 A1 * | 12/2004 | Blount et al. | 709/226 |

* cited by examiner

*Primary Examiner*—Khanh Dinh
(74) *Attorney, Agent, or Firm*—Dale F. Regelman

(57) ABSTRACT

An apparatus and a method to allocate device adapter bandwidth, where that device adapter is disposed in an information storage and retrieval system capable of communicating with one or more host computers, and where that device adapter interconnects a data cache with information storage devices. The data storage and retrieval system receives a plurality of requests from the host computers to read information from, or to write information to, information storage devices. The method determines a read/write request ratio and a non-volatile storage utilization ratio. The method allocates device adapter bandwidth based upon the read/write request ratio and/or the non-volatile storage utilization ratio.

24 Claims, 6 Drawing Sheets

APPARATUS AND METHOD TO DYNAMICALLY ALLOCATE BANDWIDTH IN A DATA STORAGE AND RETRIEVAL SYSTEM

FIELD OF THE INVENTION

This invention relates to an apparatus and method to dynamically allocate bandwidth in a data storage and retrieval system.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of write request, the system stores information received from a host computer in a data cache. In certain implementations, a copy of that information is also stored in a nonvolatile storage device. Upon receipt of a read request, the system recalls information from the one or more secondary storage devices and moves that information to the data cache.

Thus, the system is continuously moving information to and from storage devices, and to and from the data cache. One or more device adapters interconnect the data cache and the information storage devices. Prior art methods to allocate device adapter bandwidth to control the movement of data through such that device adapter by allocating task control blocks. Such prior art methods, however, do not dynamically allocate device adapter bandwidth on the basis of either the utilization of certain nonvolatile storage, or on the ratio of read and write requests.

What is needed is an apparatus and method to dynamically allocate device adapter bandwidth based upon the utilization of the nonvolatile storage and/or the ratio of read and write requests.

SUMMARY OF THE INVENTION

Applicants' invention includes a method to allocate device adapter bandwidth, where that device adapter is disposed in an information storage and retrieval system capable of communicating with one or more host computers, and where that information storage and retrieval system further comprises a data cache, nonvolatile storage ("NVS"), and one or more information storage devices, and where that device adapter interconnects the data cache and the one or more information storage devices. Applicants' method receives a plurality of requests from the one or more host computers, where that plurality of requests includes one or more read requests and one or more write requests. In certain embodiments, Applicants' method determines a read request/write request ratio and/or an NVS utilization, and dynamically allocates device adapter bandwidth to transfer information between the one or more information storage devices and the cache based upon that read request/write request ratio and/or the NVS utilization.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
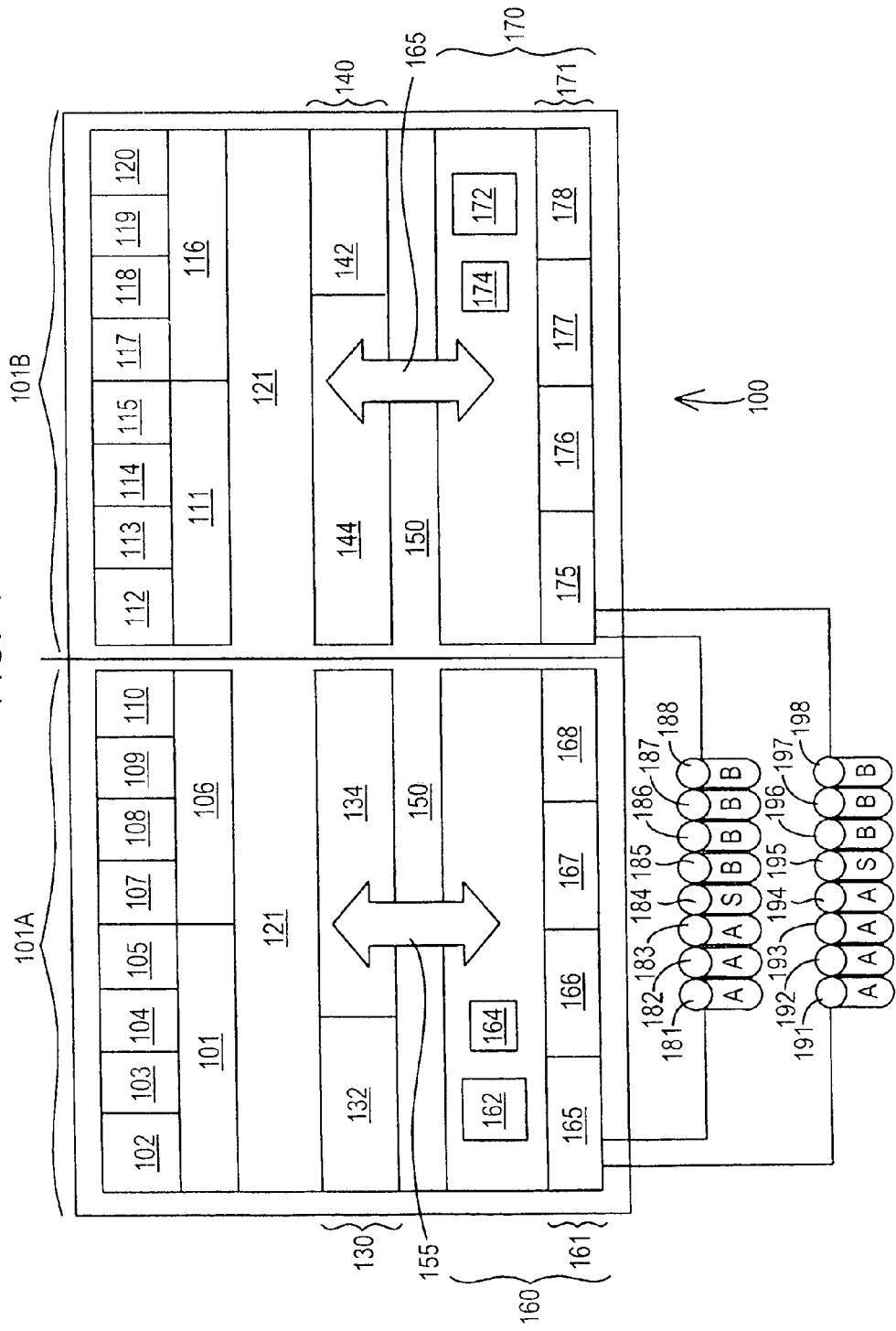
FIG. 1 is a block diagram showing the components of Applicants' data storage and retrieval system.

This invention is described in preferred embodiments in the following description with reference to the Figures, in which like numbers represent the same or similar elements. Referring now to FIG. 1. Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102–105, 107–110, 112–115, and 117–120, disposed in four host bays 101, 106, 111, and 116. Each host adapter may comprise one Fibre Channel port, one FICON port, two ESCON ports, or two SCSI ports. Each host adapter is connected to both clusters through one or more Common Platform Interconnect buses 121 and 150 such that each cluster can handle I/O from any host adapter.

Processor portion 130 includes processor 132 and cache 134. In certain embodiments, processor 132 comprises a 64-bit RISC based symmetric multiprocessor. In certain embodiments, processor 132 includes built-in fault and error-correction functions. Cache 134 is used to store both read and write data to improve performance to the attached host systems. In certain embodiments, cache 134 comprises about 4 gigabytes. In certain embodiments, cache 134 comprises about 8 gigabytes. In certain embodiments, cache 134 comprises about 12 gigabytes. In certain embodiments, cache 144 comprises about 16 gigabytes. In certain embodiments, cache 134 comprises about 32 gigabytes.

Processor portion 140 includes processor 142 and cache 144. In certain embodiments, processor 142 comprises a 64-bit RISC based symmetric multiprocessor. In certain embodiments, processor 142 includes built-in fault and error-correction functions. Cache 144 is used to store both read and write data to improve performance to the attached host systems. In certain embodiments, cache 144 comprises about 4 gigabytes. In certain embodiments, cache 144 comprises about 8 gigabytes. In certain embodiments, cache 144 comprises about 12 gigabytes. In certain embodiments, cache 144 comprises about 16 gigabytes. In certain embodiments, cache 144 comprises about 32 gigabytes.

I/O portion 160 includes non-volatile storage ("NVS") 162 and NVS batteries 164. NVS 162 is used to store a second copy of write data to ensure data integrity should there be a power failure of a cluster failure and the cache copy of that data is lost. NVS 162 stores write data provided to cluster 101B. In certain embodiments, NVS 162 comprises about 1 gigabyte of storage. In certain embodiments, NVS 162 comprises four separate memory cards. In certain embodiments, each pair of NVS cards has a battery-powered charging system that protects data even if power is lost on the entire system for up to 72 hours.

I/O portion 170 includes NVS 172 and NVS batteries 174. NVS 172 stores write data provided to cluster 101A. In certain embodiments, NVS 172 comprises about 1 gigabyte of storage. In certain embodiments, NVS 172 comprises four separate memory cards. In certain embodiments, each pair of NVS cards has a battery-powered charging system that protects data even if power is lost on the entire system for up to 72 hours.

In the event of a failure of cluster 101B, the write data for the failed cluster will reside in the NVS 162 disposed in the surviving cluster 101A. This write data is then destaged at high priority to the RAID ranks. At the same time, the surviving cluster 101A will begin using NVS 162 for its own write data thereby ensuring that two copies of write data are still maintained.

I/O portion 160 further comprises a plurality of device adapters, such as device adapters 165, 166, 167, and 168, and sixteen disk drives organized into two RAID ranks, namely RAID rank "A" and RAID rank "B". In certain embodiments, RAID ranks "A" and "B" utilize a RAID 5 protocol. In certain embodiments, RAID ranks "A" and "B" utilize a RAID 10 protocol.

As those skilled in the art will appreciate, the basic idea of RAID (Redundant Array of Independent Disks) is to combine multiple inexpensive disk drives into an array of disk drives to obtain performance, capacity and reliability that exceeds that of a single large drive. The array of drives, often referred to as the "RAID rank," appears to the host computer as a single logical drive.

RAID rank "A" includes disk drives 181, 182, 183, 184, 191, 192, and 193. RAID rank "B" includes disk drives 185, 186, 187, 188, 195, 196, 197, and 198. Each loop includes at least two spare disks, namely disks 184 and 195. Each of the RAID ranks includes one of those spare disks. As those skilled in the art will appreciate, adding a third RAID rank to loop 290 would not require the inclusion of a third spare disk.

Figure 2:
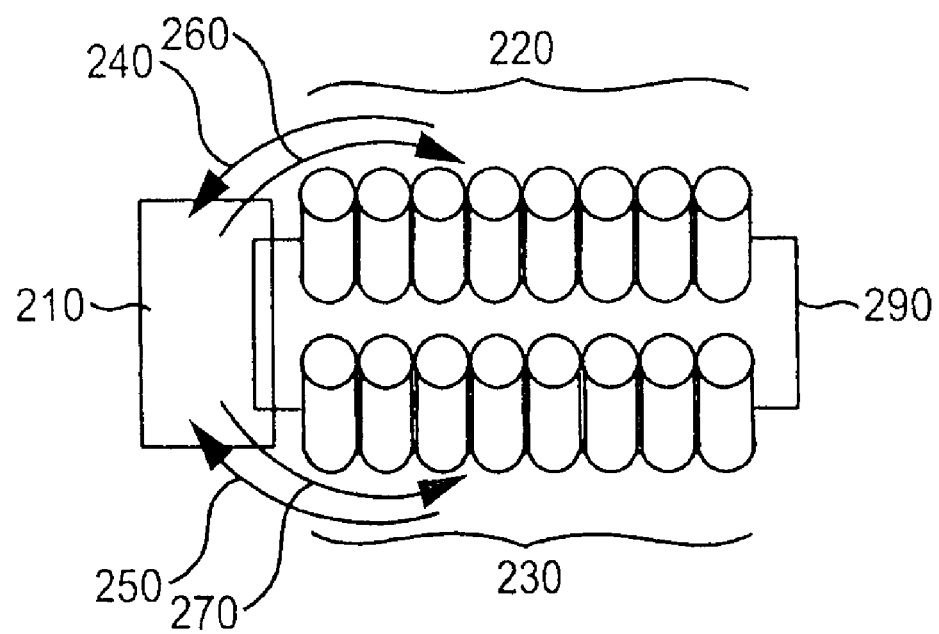
FIG. 2 is a block diagram showing a device adapter in combination with two RAID ranks.

Applicants' data storage and retrieval system 100 and Applicants' method utilize a Serial Storage Architecture ("SSA") comprising a high performance serial-connection technology for disk drives. Referring now to FIG. 2, SSA is a full-duplex loop-based architecture, with two physical read paths, i.e. read paths 240 and 250, and two physical write paths, i.e. write paths 260 and 270, to every disk drive attached to the loop. Device adapter 210 is interconnected with RAID rank 220 and RAID rank 230 by loop 290. Data is sent from adapter card 210 to the first disk drive on the loop and then passed around the loop by the disk drives until it arrives at a target disk. Unlike bus-based architectures which reserve the entire bus for data transfer, SSA uses only the part of the loop between adjacent disk drives for data transfer. Therefore, many simultaneous data transfers can take place on an SSA loop.

In certain embodiments, each read or write path on the loop operates at about 40 MBps providing a total loop bandwidth of about 160 MBps. In certain embodiments, each device adapter card supports two independent SSA loops giving a total bandwidth of about 320 MBps per adapter card. In the illustrated embodiment of FIG. 1, data storage and retrieval system 100 includes eight adapter cards, i.e. device adapter cards 165, 166, 167, 168, 175, 176, 177, and 178. In certain embodiments, system 100 has a total nominal bandwidth capability of about 2560 MBps.

Applicants' invention includes a method to dynamically allocate device adapter bandwidth. Device adapter bandwidth is required to read information from a RAID rank or write information to a RAID rank. Applicants' method dynamically adjusts the number of Task Control Blocks ("TCBs") available for stage operations, i.e. adjusts the stage TCB threshold, for each RAID rank in the system. Applicants' method further dynamically adjusts the number of TCBs available for destage operations, i.e. adjusts the destage TCB threshold, for each RAID rank in the system.

Applicants' method includes initializing foreground TCBs, i.e. first TCBs, and background TCBs, i.e. second TCBs. Certain read operations are allocated foreground TCBs while other read operations are allocated background TCBs. Similarly, certain write operations are allocated foreground TCBs while other write operations are allocated background TCBs.

A read operation sent to system 100 results in a "cache hit" if the requested information resides in the cache. In a "cache hit" read operation, the I/O operation will not disconnect from the channel/bus until the read is complete. No TCBs need be allocated for a "cache hit" read operation.

On the other hand, a "cache miss" occurs if the requested information is not in the cache. In a "cache miss" read operation, the I/O is logically disconnected from the host, allowing other I/Os to take place over the same interface, and a "stage operation"/"prestage operation" from a RAID rank takes place. Applicants' method allocates foreground TCBs for stage operations, and background TCBs for a prestage operation. The number of TCBs allocated depends on the nature of the stage operation.

A "stage operation" comprises moving data from a RAID rank to the cache in response to a host request. For certain read operations, system 100 will "prestage" information, i.e. anticipate a host request. Applicants' method monitors previous access requests, and if more than 6 I/Os in sequence are detected, then Applicants' method triggers sequential staging. In sequential staging, when about the middle of a staging group is read the next group starts to be staged, i.e. is "prestaged." This procedure delivers the maximum sequential throughput with no delays waiting for data to be staged from a disk.

A stage operation may include record/block staging wherein only the requested record/block is staged into the cache, partial track staging wherein all records or blocks on the same track until the end of the track are staged, or an entire track is staged into the cache.

In certain embodiments, Applicant's method to stage information is determined by the information access patterns. Statistics are held in the system for each zone. A zone is a contiguous area of 128 cylinders or 1920 32-KB tracks. The statistics gathered on each zone determine which of the three cache stage operations is used for a specific track.

Stage requests for sequential operations can be performed in parallel on a RAID rank. Such parallel operations can take place because the logical data tracks are striped across the physical data disks in the RAID rank. A sequential stage operation facilitates sequential read operations.

Data written to Applicants' data storage and retrieval system by a host computer is first received by a host adapter, such as host adapter 102 (FIG. 1), and is transferred first to NVS, such as NVS 172 (FIG. 1). A copy of that data is held in the host adapter buffer. The host is notified that the I/O operation is complete as soon as the data is in NVS. The host adapter, once the NVS transfer is complete, then transfers the data to the cache. The data remains in the cache and NVS until it is "destaged." In certain embodiments, destaging is triggered by cache and NVS usage thresholds.

A destage operation includes moving information from cache to a RAID rank. In a synchronous destaging operation, information is destaged to one or more RAID ranks contemporaneously with transferring that information to the data cache. Foreground TCBS are allocated for a synchronous destage operation.

In an LRU destage operation, cache space is released according to Least Recently Used algorithms. Background TCBs are allocated for an LRU destage operation. As those skilled in the art will appreciate, a Least Recently Used algorithm determines when the data tracks residing in the cache were last accessed. In certain embodiments, such an LRU algorithm includes assigning a date stamp to each track indicating when that track was last accessed. Using LRU destaging, tracks having the earliest date stamp are preferentially destaged.

Tracks that have been read sequentially are generally demoted quickly to release the used cache space because sequential data is rarely re-read within a short period of time. Applicants' method allocates background TCBs for LRU demotion operations.

When destaging tracks, Applicant's method attempts to destage all the tracks that would make up a RAID stripe thereby minimizing the RAID-related activities in the SSA adapter. Sequential write operations on the RAID 5 ranks are performed in a RAID 3 mode, i.e. parallel transfer of all stripes of the set, to avoid the read and recalculation overheads associated with the RAID 5 write operations, i.e. the "RAID 5 write penalty." An entire stripe of data is written across all the disks in a RAID rank, and the parity is generated once for all the data simultaneously and written to the parity disk, i.e. the rotating parity disk. Applicants' system 100 does not use this write procedure for RAID 10 ranks, because there is no "write penalty" involved when writing upon RAID 10 ranks.

In prior art methods, device adapter bandwidth for a particular RAID rank is allocated by limiting the number of TCBs allowed to have stages/destages pending against that RAID rank at any time. If the available foreground TCBs for a RAID rank have already been allocated, then a subsequent request for a foreground TCB is queued until one or more pending operations is completed. On the other hand, if all the available background TCBs are allocated for a RAID rank, then a subsequent request for a background TCB for that RAID rank is denied. Using these prior art methods, an LRU destage operation request is allocated the same amount of device adapter bandwidth without regard for, inter alia, the relative amount of modified data in the cache, the nature of the modified data in the cache, and/or NVS usage.

Figure 3:
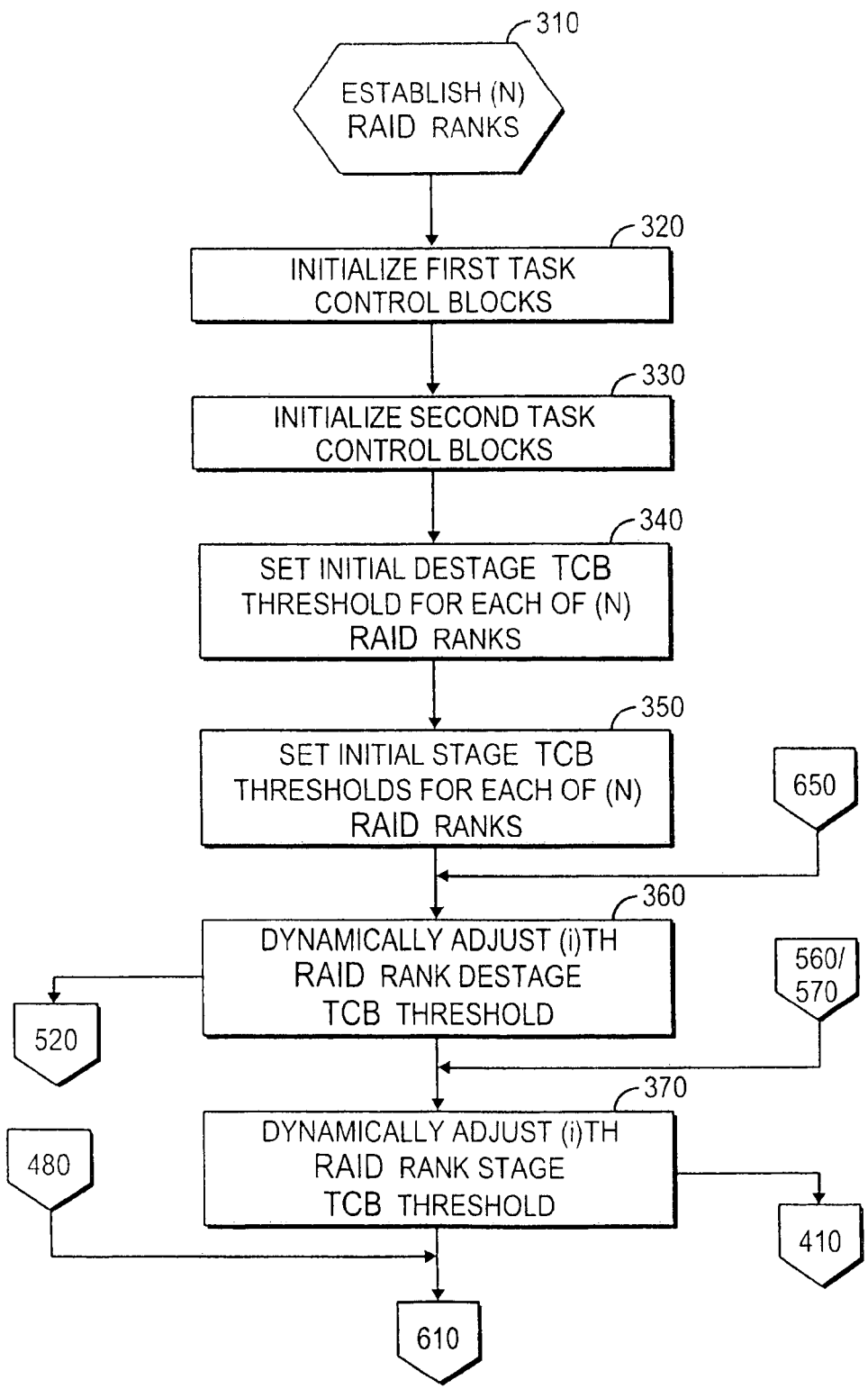
FIG. 3 is a flow chart summarizing certain steps in Applicants' method to set initial and adjusted stage and destage task control block thresholds.

Applicants' method, however, dynamically adjusts background TCB allocation. FIG. 3 summarizes Applicants' method to dynamically allocate background TCBs for staging and destaging operations. Referring now to FIG. 3, in step 310 Applicants' method establishes (N) RAID ranks, such as RAID ranks 220 (FIG. 2) and/or 230 (FIG. 2). In certain embodiments, step 310 further includes establishing a RAID protocol for each of those (N) RAID ranks.

In step 320, Applicants' method initializes foreground TCBs, i.e. first TCBs. In step 330, Applicants' method initializes background TCBs, i.e. second TCBs. In step 340, Applicants' method sets an initialize destage TCB threshold for each of the (N) RAID ranks. The initial destage TCB threshold for the (i)th RAID rank comprises the maximum number of TCBs available for performing destage operations on that (i)th RAID rank, where (i) is greater than or equal to 1 and less than or equal to (N). In step 350, Applicants' method sets an initialize stage TCB threshold for each of the (N) RAID ranks. The initial stage TCB threshold for the (i)th RAID rank comprises the maximum number of TCBs available for performing stage operations on that (i)th RAID rank.

In step 360, Applicants' method dynamically adjusts the (i)th RAID rank destage TCB threshold. In certain embodiments, step 360 comprises the steps recited in FIG. 5. In these embodiments, Applicants' method transitions from step 360 to step 520 (FIG. 5). In step 370, Applicants' method dynamically adjusts the (i)th RAID rank stage TCB threshold. In certain embodiments, step 370 comprises the steps recited in FIG. 4. In these embodiments, Applicants' method transitions from step 370 to step 410 (FIG. 5).

Figure 6:
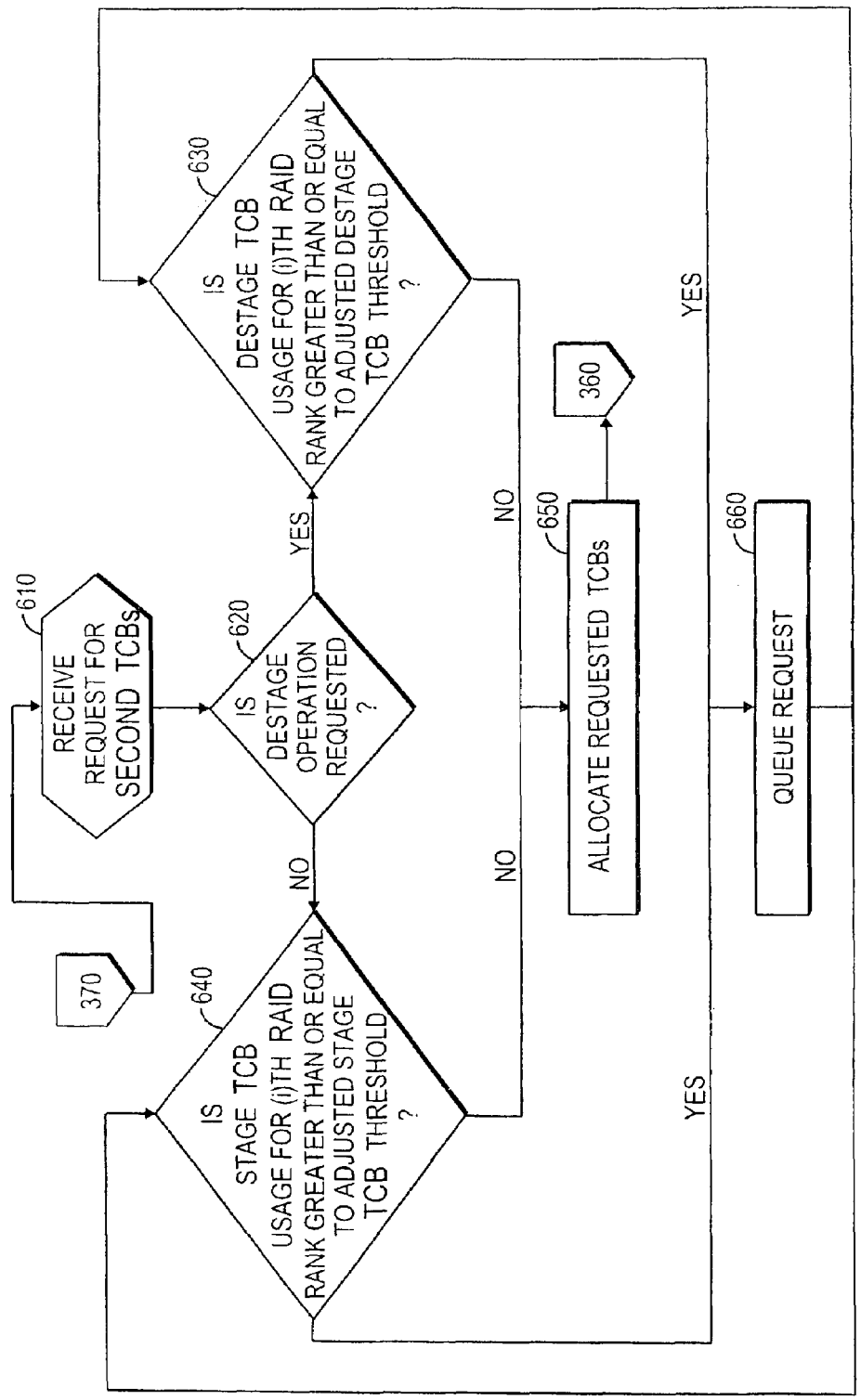
FIG. 6 summarizing the steps of Applicants' method to utilize adjusted stage and destage task control block thresholds.

Applicants' method transitions from step 370 to step 610 (FIG. 6). In step 610, Applicants' system receives a request for (M) background TCBs, i.e. for (M) second TCBs. The request of step 610 may comprise a stage operation or, alternatively, a destage operation. Applicants' method transitions from step 610 to step 620 wherein Applicants' method determines if the requesting operation is a destage operation.

If Applicants' method determines in step 620 that the requesting operation comprises a destage operation, then Applicants' method transitions from step 620 to step 630. Alternatively, if Applicants' method determines in step 620 that the requesting operation does not comprises a destage operation, then Applicants' method transitions from step 620 to step 640.

In step 630 Applicants' method determines if the destage TCB useage for the (i)th RAID rank is greater than or equal to the adjusted destage TCB threshold for that RAID rank, i.e. if (M) second TCBs are available for the (i)th RAID rank. If Applicants' method determines in step 630 that the destage TCB useage for the (i)th RAID rank is greater than or equal to the adjusted destage TCB threshold for that RAID rank, i.e. that (M) second TCBs are not available, then Applicants' method transitions from step 630 to step 660 wherein the destage operation is queued. Alternatively, if Applicants' method determines in step 630 that the destage TCB useage for the (i)th RAID rank is not greater than or equal to the adjusted destage TCB threshold for that RAID rank, i.e. that (M) second TCBs are available, then Applicants' method transitions from step 630 to step 650 wherein Applicants' method allocates the (M) second TCBs to the requesting destage operation.

Periodically, Applicants' method transitions from step 660 to step 630 wherein Applicants' method again determines if the destage TCB useage for the (i)th RAID rank is greater than or equal to the adjusted destage TCB threshold for that RAID rank, i.e. if (M) second TCBs are available for the (i)th RAID rank. Applicants' method loops between steps 660 and 630 until sufficient second TCBs become available for the (i)th RAID rank to perform the queued destage operation at which time Applicants' method transitions from step 630 to step 650.

In step 640 Applicants' method determines if the stage TCB useage for the (i)th RAID rank is greater than or equal to the adjusted stage TCB threshold for that RAID rank, i.e. if (M) second TCBs are available for the (i)th RAID rank. If Applicants' method determines in step 640 that the stage TCB useage for the (i)th RAID rank is greater than or equal to the adjusted destage TCB threshold for that RAID rank, i.e. that (M) second TCBs are not available, then Applicants' method transitions from step 640 to step 660 wherein the stage operation is queued. Alternatively, if Applicants' method determines in step 640 that the stage TCB useage for the (i)th RAID rank is not greater than or equal to the adjusted destage TCB threshold for that RAID rank, i.e. that (M) second TCBs are available, then Applicants' method transitions from step 640 to step 650 wherein Applicants' method allocates the (M) second TCBs to the requesting stage operation.

Periodically, Applicants' method transitions from step 660 to step 640 wherein Applicants' method again determines if the stage TCB useage for the (i)th RAID rank is greater than or equal to the adjusted destage TCB threshold for that RAID rank, i.e. if (M) second TCBs are available for the (i)th RAID rank. Applicants' method loops between steps 660 and 640 until sufficient second TCBs become available for the (i)th RAID rank to perform the queued stage operation at which time Applicants' method transitions from step 640 to step 650.

In certain embodiments, the dynamic adjustment of the destage TCB thresholds for each of the (N) RAID ranks in step 360 includes the steps recited in FIG. 5. Referring now to FIG. 5, in step 510 Applicants' method sets a Non-Volatile Storage ("NVS") threshold for each of the (N) RAID ranks. For example, if Applicants' system includes four RAID ranks, then step 510 may include setting the NVS threshold at twenty-five percent (25%) for each of those four RAID ranks. In certain embodiments, when the NVS threshold for a RAID rank is reached, no further write operations will be performed against that RAID rank. Therefore, Applicants' method monitors the NVS useage by each of the (N) RAID ranks.

In step 520, Applicants' method defines a destage TCB threshold adjustment function. In certain embodiments, the destage TCB threshold adjustment function of step 520 includes using a "look up" table, such as TABLE I.

TABLE I

| RATIO | PERCENTAGE OF SECOND TCBs AVAILABLE FOR DESTAGE OPERATIONS |
|---|---|
| 0.80+ | 100 |
| 0.70 | 85 |
| 0.50 | 50 |
| 0.30 | 15 |
| 0.10 | 10 |

In certain embodiments, the destage TCB threshold adjustment function of step 520 comprises a second order equation, such as equation (1):

$$\text{Adjusted } (i)th \text{ Destage} = [a(U/T)^2 + b(U/T) + c] \times [\text{available } (i)th \text{ second TCBs}] \quad (1)$$

TCB Threshold

In other embodiments, the destage TCB threshold adjustment function of step 520 comprises a third order equation, such as equation (2);

$$\text{Adjusted } (i)th \text{ Destage} = [a(U/T)^3 + b(U/T)^2 + c(U/T) + d] \times [\text{available } (i)th \text{ second TCBs}] \quad (2)$$

TCB Threshold

In certain embodiments, the destage TCB threshold adjustment function of step 520 comprises a fourth order or greater function of the ratio (U/T).

In step 530, Applicants' method determines the current NVS useage for the (i)th RAID rank, where (i) is an integer greater than or equal to 1 and less than or equal to (N). In step 540, Applicants' method calculates the ratio (U/T) comprising the current NVS useage by that (i)th RAID rank divided by the NVS threshold for that (i)th RAID rank.

In step 550, Applicants' method adjusts the destage TCB threshold for the (i)th RAID rank as a using the ratio determined in step 530 and the destage TCB threshold adjustment function of step 520. In the embodiment of TABLE I, for example, if Applicants' method determines in step 540 that the (i)th RAID rank is using eighty percent or more of its NVS threshold, then in step 550 Applicants' method adjusts the destage TCBs for that RAID rank to comprise one hundred percent (100%) of the second TCBs available for that RAID rank. Alternatively, using the embodiment of TABLE I if Applicants' method determines in step 540 that the (i)th RAID rank is using thirty percent of its NVS threshold, then in step 550 Applicants' method adjusts the destage TCBs for that RAID rank to comprise fifteen percent (15%) of the second TCBs available for that RAID rank.

Applicants' method transitions from step 550 to step 560 wherein Applicants' method determines if a destage operation is required for the (i) RAID rank. If Applicants' method determines in step 560 that a destage operation is not required, then Applicants' method transitions from step 560 to step 370 and continues. If Applicants' method determines in step 560 that a destage operation is required, then Applicants' method transitions from step 560 to step 570 wherein Applicants' method destages tracks from the cache to the (i) RAID rank. In certain embodiments, step 570 includes using a Least Recently Used destage protocol. Applicants' method transitions from step 570 to step 370 and continues.

Figure 4:
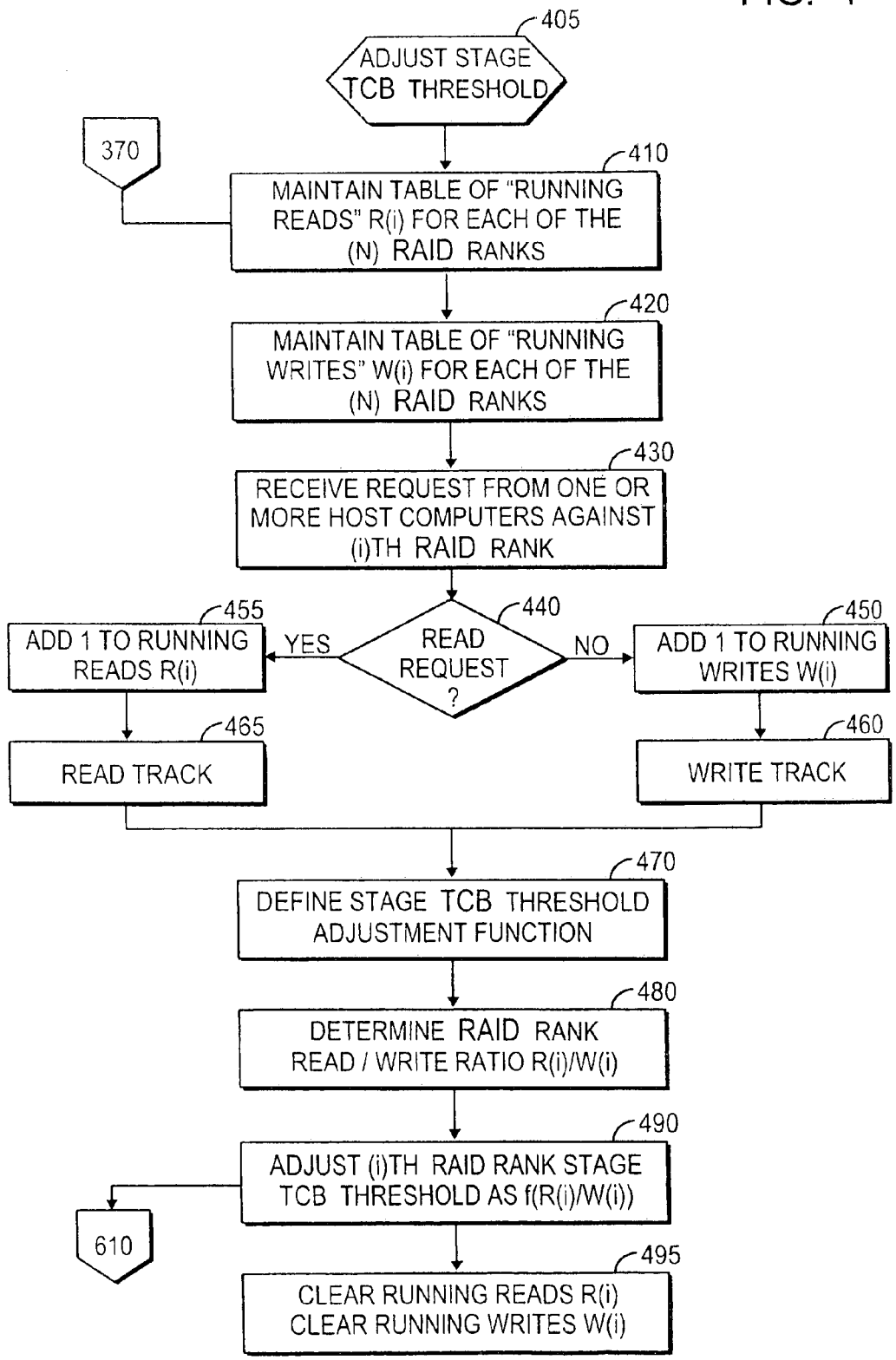
FIG. 4 is a flow chart summarizing additional steps in Applicants' method to adjust a stage task control block threshold.
Figure 5:
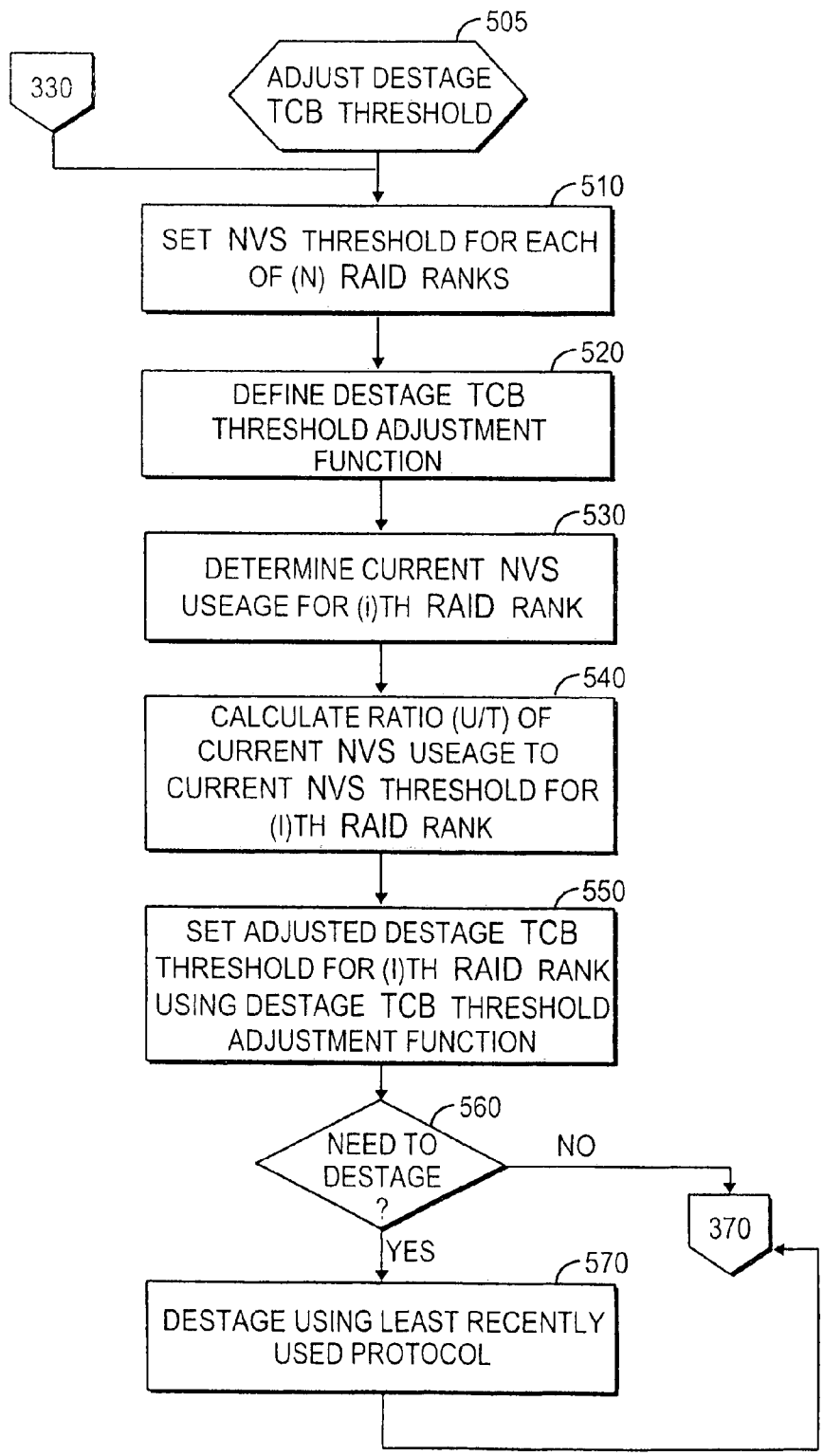
FIG. 5 is a flow chart summarizing additional steps in Applicants' method to adjust a destage task control block threshold.

In certain embodiments, the dynamic adjustment of the (i)th RAID rank stage TCB threshold of step 370 (FIG. 3) includes the steps recited in FIG. 4. Referring now to FIG. 4, in step 410 Applicants' method maintains a table of "running reads" R(i) for each of the (N) RAID ranks, where (i) is an integer greater than or equal to 1 and less than or equal to (N). The value of R(i) comprises the number of read requests received against the (i)th RAID rank received after the table of running reads was last cleared. In step 420 Applicants' method maintains a table of "running writes" W(i) for each of the (N) RAID ranks, where (i) is an integer greater than or equal to 1 and less than or equal to (N). The value of W(i) comprises the number of write requests received against the (i)th RAID rank received after the table of running writes was last cleared.

In step 430, Applicants' method receives a request from one or more host computers. In step 440, Applicants' method determines if the request comprises a read request or a write request. If Applicants' method determines in step 440 that the request of step 430 does not comprises a read request, then Applicants' method transitions from step 440 to step 450 wherein Applicants' method adds 1 to running writes table of step 410. Applicants' method transitions from step 450 to step 460 wherein Applicants' method writes the track to the cache. Applicants' method transitions from step 460 to step 470.

If Applicants' method determines in step 440 that the request of step 430 comprises a read request, then Applicants' method transitions from step 440 to step 455 wherein Applicants' method adds 1 to running read table of step 410. Applicants' method transitions from step 455 to step 465 wherein Applicants' method reads the requested track. Applicants' method transitions from step 465 to step 470.

In step 470, Applicants' method defines a stage TCB threshold adjustment function. That stage task control block adjustment function is used to dynamically adjust the stage TCB thresholds for the various RAID ranks. In certain embodiments, the stage task control block adjustment function of step 470 comprises a "look up" table, such as TABLE II.

TABLE II

| R(i)/W(i) | PERCENTAGE OF SECOND TCBs AVAILABLE FOR STAGE OPERATIONS |
|---|---|
| 1.3+ | 90 |
| 1.15 | 65 |
| 1 | 50 |
| 0.85 | 35 |
| 0.50− | 10 |

In certain embodiments, the stage task control block adjustment function of step 470 comprises a second order equation, such as equation (3):

$$\text{Adjusted } (i)th \text{ Stage} = [a(R(i)/W(i))^2 + b(R(i)/W(i)) + c] \times [(i)th \text{ second TCBs}] \quad (3)$$

TCB Threshold

In other embodiments, the stage task control block adjustment function of step 470 comprises a third order equation, such as equation (4):

$$\text{Adjusted } (i)th \text{ Stage} = [a(R(i)/W(i))^3 + b(R(i)/W(i))^2 + c(R(i)) + d] \times [(i)th \text{ second TCBs}] \quad (4)$$

TCB Threshold

In certain embodiments, the stage task control block adjustment function of step 470 comprises a fourth order or greater function of the ratio $(R(i)/W(i))$.

In step 480, Applicants' method determines the read to write ratio, i.e. $R(i)/W(i)$, for the (i)th RAID rank. In step 490, Applicants' method adjusts the stage TCB threshold for the (i)th RAID rank as a function of $R(i)/W(i)$ and the stage control block adjustment function of step 470.

In the embodiment of TABLE II, for example, if Applicants' method determines in step 480 that the read/write ratio for the (i)th RAID rank is 1.3 or greater, then in step 490 Applicants' method adjusts the stage TCB threshold for that RAID rank to comprise ninety percent (90%) of the second TCBs available for that RAID rank. Alternatively, using the embodiment of TABLE II if Applicants' method determines in step 480 that the read/write ratio for the (i)th RAID rank is 0.7 or less, then in step 490 Applicants' method adjusts the stage TCB threshold for that RAID rank to comprise ten percent (10%) of the second TCBs available for that RAID rank.

Applicants' method transition from step 490 to step 610 (FIG. 6). Periodically, Applicants' method also transitions from step 490 to step 495 wherein Applicants' method clears the running reads table and resets the running reads value to 0, and wherein Applicants' method clears the running writes table and resets the running writes value to 0.

The embodiments of Applicants' method recited in FIGS. 3, 4, 5, and/or 6, may be implemented separately. Moreover, in certain embodiments, individual steps recited in FIGS. 3 and/or 4 and/or 5 and/or 6 may be combined, eliminated, or reordered.

Applicants' invention further includes an article of manufacture comprising a computer useable medium having computer readable program code disposed therein method to dynamically adjust the allocation of device adapter bandwidth in Applicants' data storage and retrieval system.

Applicants' invention further includes a computer program product usable with a programmable computer processor having computer readable program code embodied therein method to dynamically adjust the allocation of device adapter bandwidth in Applicants' data storage and retrieval system.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to allocate device adapter bandwidth, wherein said device adapter is disposed in an information storage and retrieval system capable of communicating with one or more host computers, wherein said information storage and retrieval system further comprises non-volatile storage having NVS total storage capacity, a data cache, and one or more information storage devices, wherein said device adapter interconnects said data cache and said one or more information storage devices, said method comprising the steps of:

establishing (N) storage arrays, wherein said (N) arrays comprise said one or more information storage devices;

initializing a plurality of task control blocks;

setting an initial (i)th stage task control block threshold, wherein said initial (i)th stage task control block threshold comprises one or more of said plurality of task control blocks, and wherein (i) is an integer greater than or equal to 1 and less than or equal to (N);

defining a stage task control block adjustment function;

determining the (i)th read request/write request ratio for the (i)th storage array;

setting an adjusted (i)th stage task control block threshold using said stage task control block adjustment function and said (i)th read request/write request ratio, wherein said adjusted (i)th stage task control block threshold comprises one or more of said plurality of task control blocks;

receiving a plurality of requests from said one or more host computers, wherein said plurality of requests comprises one or more read requests and one or more write requests, and wherein said one or more write requests comprise second information;

determining a read request/write request ratio;

allocating device adapter bandwidth to transfer first information from said one or more information storage devices to said cache based upon said read request/write request ratio;

writing said second information to said non-volatile memory and to said data cache, wherein said second information utilizes actual NVS storage;

determining a utilization ratio by dividing said actual NVS storage by said NVS total storage capacity;

allocating device adapter bandwidth to transfer said second information from said data cache to said one or more information storage devices based said utilization ratio.

2. The method of claim 1, further comprising the steps of:

maintaining a running reads table;

maintaining a running writes table;

receiving a host computer request;

determining if said host computer request comprises a read request;

operative if said host computer request comprises a read request, adding 1 to said running reads table; and operative if said host computer request does not comprise a read request, adding 1 to said running writes table.

3. The method of claim 2, further comprising the step of:
clearing said running reads table; and
clearing said running writes table.

4. The method of claim 1, wherein said a stage task control block adjustment function comprises a look-up table.

5. The method of claim 1, further comprising the steps of:
receiving a request against said (i)th storage array for a stage operation comprising (M) task control blocks;
determining if said adjusted (i)th stage task control block threshold is greater than or equal to (M);
operative if said adjusted (i)th stage task control block threshold is greater than or equal to (M), allocating (M) task control blocks for said stage operation;
operative if said adjusted (i)th stage task control block threshold is not greater than or equal to (M), queuing said stage operation.

6. The method of claim 1, further comprising the steps of:
setting the (i)th destage task control block threshold, wherein said (i)th destage task control block threshold comprises one or more of said task control blocks;
defining a destage task control block adjustment function;
setting the (i)th non-volatile storage threshold, wherein said (i)th non-volatile storage threshold comprises a first percentage of said NVS total storage capacity;
receiving (i)th information, wherein said (i)th information comprises data to be written to said (i)th storage array;
writing said (i)th information to said non-volatile storage, wherein said (i)th information utilizes a second percentage of said NVS total storage capacity;
determining the (i)th utilization ratio by dividing said first percentage by said second percentage;
setting an adjusted (i)th destage task control block threshold using said destage task control block adjustment function and said (i)th utilization ratio, wherein said adjusted (i)th destage task control block threshold comprises one or more of said plurality of task control blocks.

7. The method of claim 6, wherein said a destage task control block adjustment function comprises a look-up table.

8. The method of claim 6, further comprising the steps of:
receiving a request against said (i)th storage array for a destage operation comprising (M) task control blocks;
determining if said adjusted (i)th destage task control block threshold is greater than or equal to (M);
operative if said adjusted (i)th destage task control block threshold is greater than or equal to (M), allocating (M) task control blocks for said destage operation;
operative if said adjusted (i)th destage task control block threshold is not greater than or equal to (M), queuing said destage operation.

9. An article of manufacture comprising a computer readable medium having computer readable program code disposed therein to allocate device adapter bandwidth, wherein said device adapter is disposed in an information storage and retrieval system capable of communicating with one or more host computers, wherein said information storage and retrieval system further comprises non-volatile storage having NVS total storage capacity, a data cache and one or more information storage devices, wherein said device adapter interconnects said data cache and said one or more information storage devices, the computer readable program code comprising a series of computer readable program steps to effect:
establishing (N) storage arrays, wherein said (N) arrays comprise said one or more information storage devices;
initializing a plurality of task control blocks;
setting an initial (i)th stage task control block threshold, wherein said initial (i)th stage task control block threshold comprises one or more of said plurality of task control blocks, and wherein (i) is an integer greater than or equal to 1 and less than or equal to (N);
defining a stage task control block adjustment function;
determining the (i)th read request/write request ratio for the (i)th storage array;
setting an adjusted (i)th stage task control block threshold using said stage task control block adjustment function and said (i)th read request/write request ratio, wherein said adjusted (i)th stage task control block threshold comprises one or more of said plurality of task control blocks;
receiving a plurality of requests from said one or more host computers, wherein said plurality of requests comprises one or more read requests and one or more write requests, and wherein said one or more write requests comprise second information;
determining a read request/write request ratio;
allocating device adapter bandwidth to transfer first information from said one or more information storage devices to said cache based upon said read request/write request ratio;
writing said second information to said non-volatile memory and to said data cache, wherein said second information utilizes actual NVS storage;
determining a utilization ratio by dividing said actual NVS storage by said NVS total storage capacity;
allocating device adapter bandwidth to transfer said second information from said data cache to said one or more information storage devices based said utilization ratio.

10. The article of manufacture of claim 9, said computer readable program code further comprising a series of computer readable program steps to effect:
maintaining a running reads table;
maintaining a running writes table;
receiving a host computer request;
determining if said host computer request comprises a read request;
operative if said host computer request comprises a read request, adding 1 to said running reads table; and
operative if said host computer request does not comprise a read request, adding 1 to said running writes table.

11. The article of manufacture of claim 10, said computer readable program code further comprising a series of computer readable program steps to effect:
clearing said running reads table; and
clearing said running writes table.

12. The article of manufacture of claim 9, wherein said stage task control block adjustment function comprises a look-up table.

13. The article of manufacture of claim 9, said computer readable program code further comprising a series of computer readable program steps to effect:
receiving a request against said (i)th storage array for a stage operation comprising (M) task control blocks;
determining if said adjusted (i)th stage task control block threshold is greater than or equal to (M);
operative if said adjusted (i)th stage task control block threshold is greater than or equal to (M), allocating (M) task control blocks for said stage operation;
operative if said adjusted (i)th stage task control block threshold is not greater than or equal to (M), queuing said stage operation.

14. The article of manufacture of claim 9, said computer readable program code further comprising a series of computer readable program steps to effect:

setting the (i)th destage task control block threshold, wherein said (i)th destage task control block threshold comprises one or more of said task control blocks;

retrieving a predetermined a destage task control block adjustment function;

setting the (i)th non-volatile storage threshold, wherein said (i)th non-volatile storage threshold comprises a first percentage of said NVS total storage capacity;

receiving (i)th information, wherein said (i)th information comprises data to be written to said (i)th storage array;

writing said (i)th information to said non-volatile storage, wherein said (i)th information utilizes a second percentage of said NVS total storage capacity;

determining the (i)th utilization ratio comprising said first percentage and said second percentage;

setting an adjusted (i)th destage task control block threshold using said destage task control block adjustment function and said (i)th utilization ratio, wherein said adjusted (i)th destage task control block threshold comprises one or more of said plurality of task control blocks.

15. The article of manufacture of claim 14, wherein said destage task control block adjustment function comprises a look-up table.

16. The article of manufacture of claim 14, said computer readable program code further comprising a series of computer readable program steps to effect:

receiving a request against said (i)th storage array for a destage operation comprising (M) task control blocks;

determining if said adjusted (i)th destage task control block threshold is greater than or equal to (M);

operative if said adjusted (i)th destage task control block threshold is greater than or equal to (M), allocating (M) task control blocks for said destage operation;

operative if said adjusted (i)th destage task control block threshold is not greater than or equal to (M), queuing said destage operation.

17. A computer program product embodied in an information storage medium, said computer program product being usable with a programmable computer processor to allocate device adapter bandwidth, wherein said device adapter is disposed in an information storage and retrieval system capable of communicating with one or more host computers, wherein said information storage and retrieval system further comprises non-volatile storage having a total NVS storage capacity, a data cache and one or more information storage devices, wherein said device adapter interconnects said data cache and said one or more information storage devices, comprising:

computer readable program code which causes said programmable computer processor to establish (N) storage arrays, wherein said (N) arrays comprise said one or more information storage devices;

computer readable program code which causes said programmable computer processor to initialize a plurality of task control blocks;

computer readable program code which causes said programmable computer processor to set an initial (i)th stage task control block threshold, wherein said initial (i)th stage task control block threshold comprises one or more of said plurality of task control blocks, and wherein (i) is an integer greater than or equal to 1 and less than or equal to (N);

computer readable program code which causes said programmable computer processor to define a stage task control block adjustment function;

computer readable program code which causes said programmable computer processor to determine the (i)th read request/write request ratio for the (i)th storage array;

computer readable program code which causes said programmable computer processor to set an adjusted (i)th stage task control block threshold using said stage task control block adjustment function and said (i)th read request/write request ratio, wherein said adjusted (i)th stage task control block threshold comprises one or more of said plurality of task control blocks;

computer readable program code which causes said programmable computer processor to receive a plurality of requests from said one or more host computers, wherein said plurality of requests comprises one or more read requests and one or more write requests, and wherein said one or more write requests comprise second information;

computer readable program code which causes said programmable computer processor to determine a read request/write request ratio;

computer readable program code which causes said programmable computer processor to allocate device adapter bandwidth to transfer first information from said one or more information storage devices to said cache based upon said read request/write request ratio;

computer readable program code which causes said programmable computer processor to write said second information to said non-volatile memory and to said data cache, wherein said second information utilizes actual NVS storage;

computer readable program code which causes said programmable computer processor to determine a utilization ratio by dividing said actual NVS storage by said NVS total storage capacity;

computer readable program code which causes said programmable computer processor to allocate device adapter bandwidth to transfer said second information from said data cache to said one or more information storage devices based said utilization ratio.

18. The computer program product of claim 17, further comprising:

computer readable program code which causes said programmable computer processor to maintain a running reads table;

computer readable program code which causes said programmable computer processor to maintain a running writes table;

computer readable program code which causes said programmable computer processor to receive a host computer request;

computer readable program code which causes said programmable computer processor to determine if said host computer request comprises a read request;

computer readable program code which, if said host computer request comprises a read request, causes said programmable computer processor to add 1 to said running reads table; and computer readable program code which, if said host computer request does not comprise a read request, causes said programmable computer processor to add 1 to said running writes table.

19. The computer program product of claim 18, further comprising computer readable program code which causes said programmable computer processor to clear said running reads table; and computer readable program code which causes said programmable computer processor to clear said running writes table.

20. The computer program product of claim 17, wherein said stage task control block adjustment function comprises a look-up table.

21. The computer program product of claim 17, further comprising:

computer readable program code which causes said programmable computer processor to receive a request against said (i)th storage array for a stage operation comprising (M) task control blocks;

computer readable program code which causes said programmable computer processor to determine if said adjusted (i)th stage task control block threshold is greater than or equal to (M);

computer readable program code which, if said adjusted (i)th stage task control block threshold is greater than or equal to (M), causes said programmable computer processor to allocate (M) task control blocks for said stage operation;

computer readable program code which, if said adjusted (i)th stage task control block threshold is not greater than or equal to (M), causes said programmable computer processor to queue said stage operation.

22. The computer program product of claim 17, further comprising:

computer readable program code which causes said programmable computer processor to set the (i)th destage task control block threshold, wherein said (i)th destage task control block threshold comprises one or more of said task control blocks;

computer readable program code which causes said programmable computer processor to retrieve a predetermined destage task control block adjustment function;

computer readable program code which causes said programmable computer processor to set the (i)th non-volatile storage threshold, wherein said (i)th non-volatile storage threshold comprises a first percentage of said total NVS storage capacity;

computer readable program code which causes said programmable computer processor to receive (i)th information, wherein said (i)th information comprises data to be written to said (i)th storage array;

computer readable program code which causes said programmable computer processor to write said (i)th information to said non-volatile storage, wherein said (i)th information utilizes a second percentage of said total NVS storage capacity;

computer readable program code which causes said programmable computer processor to determine the (i)th utilization ratio by dividing said second percentage by said first percentage;

computer readable program code which causes said programmable computer processor to set an adjusted (i)th destage task control block threshold using said destage task control block adjustment function and said (i)th utilization ratio, wherein said adjusted (i)th destage task control block threshold comprises one or more of said plurality of task control blocks.

23. The computer program product of claim 22, wherein said destage task control block adjustment function comprises a look-up table.

24. The computer program product of claim 22, further comprising:

computer readable program code which causes said programmable computer processor to receive a request against said (i)th storage array for a destage operation comprising (M) task control blocks;

computer readable program code which causes said programmable computer processor to determine if said adjusted (i)th destage task control block threshold is greater than or equal to (M);

computer readable program code which, if said adjusted (i)th destage task control block threshold is greater than or equal to (M), causes said programmable computer processor to allocate (M) task control blocks for said destage operation;

computer readable program code which, if said adjusted (i)th destage task control block threshold is not greater than or equal to (M), causes said programmable computer processor to queue said destage operation.

* * * * *